United States Patent
Bullock et al.

(10) Patent No.: US 6,282,869 B1
(45) Date of Patent: Sep. 4, 2001

(54) METHOD OF CUTTING AND SEALING FILM

(75) Inventors: Kyle B. Bullock, Lyman; Robert D. All, Greenville; Howard D. Connor, Mauldin; David W. Grams, Greer; Shawn D. Harris, Greenville; Gregory E. McDonald, Simpsonville; F. Ted Oakhill, Greenville; Julian L. Pruitt, Greer; William Z. Snow, Simpsonville; Andrew W. VanPutte, Greer; Jeffrey L. Walker, Easley; Jay B. Wilson, Simpsonville; George D. Wofford, Duncan, all of SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/119,481

(22) Filed: Jul. 20, 1998

Related U.S. Application Data

(60) Provisional application No. 60/053,246, filed on Jul. 21, 1997.

(51) Int. Cl.[7] .............................. B65B 9/08; B31B 31/18
(52) U.S. Cl. .............................. 53/434; 53/459; 53/469; 53/479; 53/373.4; 156/256; 156/267
(58) Field of Search ...................... 53/479, 373.4, 53/547, 433, 434, 459, 469, 512, 570, 329.5, 370.4; 156/228, 256, 267, 517

(56) References Cited

U.S. PATENT DOCUMENTS

| | | | |
|---|---|---|---|
| 3,383,746 | 5/1968 | Narduzzi et al. | 29/33.5 |
| 3,413,175 | 11/1968 | Rochla . | |
| 3,552,090 | 1/1971 | Roberts et al. | 53/71 |
| 3,628,576 | 12/1971 | Owen | 141/65 |
| 3,665,673 * | 5/1972 | Billet et al. | 53/479 X |
| 3,928,938 | 12/1975 | Burrell | 53/22 |
| 3,958,391 | 5/1976 | Kujubu | 53/22 |
| 3,983,682 * | 10/1976 | Scully | 53/547 X |
| 4,064,296 | 12/1977 | Bornstein et al. | 428/35 |
| 4,120,716 | 10/1978 | Bonet | 156/272 |
| 4,278,738 | 7/1981 | Brax et al. | 428/515 |
| 4,302,565 | 11/1981 | Goeke et al. | 526/88 |
| 4,302,566 | 11/1981 | Karol et al. | 526/125 |
| 4,512,138 * | 4/1985 | Greenawalt | 53/479 X |

(List continued on next page.)

FOREIGN PATENT DOCUMENTS

| | | |
|---|---|---|
| 0 273 066 | 7/1988 | (EP) . |
| 1 491 671 | 11/1977 | (GB) . |
| 2 094 707 | 9/1982 | (GB) . |
| WO 90/03414 | 4/1990 | (WO) . |
| WO 93/03093 | 2/1993 | (WO) . |

OTHER PUBLICATIONS

ASTM D–2732, "Standard Test Method for Unrestrained Linear thermal Shrinkage of Plastic Film and Sheeting", 1989, pp. 368 371.

Journal of Polymer Science, Wild et al., "Determination of Branching Distributions in Polyethylene and Ethylene Copolymers", pp. 441–455, vol. 20, 1982.

Primary Examiner—Stephen F. Gerrity
(74) Attorney, Agent, or Firm—Rupert B. Hurley Jr.

(57) ABSTRACT

In the packaging of a wide variety of products in flexible film bags, problems with edge tear and incomplete bag cut-off have been encountered. The edge tear and incomplete cut-off are worse for films containing low melting polymers, such as metallocene-catalyzed ethylene/alpha-olefin copolymers. These problems can be solved using a clamp-cut-seal process, as opposed to a clamp-seal-cut process. By cutting before sealing, the film is still cool, and the strain on the film due to the cutting does not pull on the seal area enough to cause edge tearing (i.e., tearing at the seal). The higher resistance to elongation of the cool, clamped film also serves to reduce or prevent incomplete bag tail cutoff. Also, by providing a means for sealing which clamps the film before it is cut, defective seals from bag "pull back" can be avoided.

20 Claims, 9 Drawing Sheets

U.S. PATENT DOCUMENTS

| | | | |
|---|---|---|---|
| 4,550,548 | 11/1985 | Owensby et al. | 53/434 |
| 4,697,401 * | 10/1987 | Kessler et al. | 53/373.4 X |
| 4,845,927 | 7/1989 | Rapparini . | |
| 4,879,430 | 11/1989 | Hoffman | 428/35.1 |
| 5,206,075 | 4/1993 | Hodgson, Jrl. | 428/216 |
| 5,241,031 | 8/1993 | Mehta | 526/348.1 |
| 5,272,236 | 12/1993 | Lai et al. | 526/348.5 |
| 5,278,272 | 1/1994 | Lai et al. | 526/348.5 |
| 5,638,660 * | 6/1997 | Kuo . | |
| 5,759,648 * | 6/1998 | Idlas . | |
| 5,843,540 * | 12/1998 | Heydarpour et al. . | |
| 5,882,789 * | 3/1999 | Jones et al. . | |
| 6,110,570 * | 8/2000 | Paleari et al. . | |

* cited by examiner

METHOD OF CUTTING AND SEALING FILM

This application claims the benefit of provisional application No. 60/053,246, filed Jul. 21, 1997, hereby incorporated in its entirety by reference thereto.

FILED OF THE INVENTION

The present invention pertains to the field of film processing, more particularly, film sealing and cutting. The invention pertains especially to the sealing and cutting of flexible packaging films, especially for the packaging of food products, such as meat.

BACKGROUND OF THE INVENTION

Flexible film bags are manufactured and sold for the packaging of a wide variety of products, especially food products such as meat. In use, the product, such as cut of fresh beef, ham, or pork, is placed into a bag having an open top and excess length (i.e., "bag tail"). After the product is within the bag, the atmospheric gases inside the bag are typically evacuated from the bag, and a heat seal is made across the top of the bag, near the product. After the seal is made across the top of the bag, the excess bag length (i.e., bag tail) is cut away from the packaged product and discarded or recycled. The film surrounding the meat is typically heat shrinkable, and is shrunk down against the meat product by passing the packaged product through a hot water tunnel, or other means for causing the film to shrink.

Beginning around 1976, the Cryovac division of W.R. Grace & Co. introduced the 8300 series automated rotary chamber vacuum bag packaging machine. This machine was and is successful in the marketplace. In operation, the 8300 machine clamped the bag between two clamps, punctured the bag, drew a vacuum within the bag, and then cut and heat-sealed the bag, to produce a packaged product in which the meat product was sealed within a vacuumized bag. Frequently, the bag was thereafter shrunk down tight against the meat product in a shrink tunnel, thereby further improving the appearance of the packaged product. The 8300 series machine performed the cutting and heat sealing operation by deploying a one-piece cutting/sealing member from a position above the film. The cutting/sealing member sealed the film by applying heat and pressure to the film as it held the film against a stationary seal seat located immediately on the other side of the film. Since by necessity the cutting knife impacted the film before the seal portion of the cutting/sealing member, the film was cut before it was held against the sealing member. As a result, due to the ballooning of the bag due to the relatively high pressure within the bag (due to the evacuation of the surrounding atmosphere in the chamber, and the relatively slow departure of air from within the bag), there was an undesirably high occurrence of bag "pull-back," in which, in spite of a clamp between the freshly-cut top of the bag and the product in the bag, the freshly-cut top of the bag was pulled back towards the product after cutting but before the sealing wire had a chance to clamp the bag film. The result of pull-back is a defective seal. The 8300 series machine also experienced some problems in accomplishing a complete cut-off of the bag tail, i.e., the excess portion of the bag to be removed and discarded. Partially-cut off bag tails occurred with greater frequency as the knife blade dulled from use. The partially-cut off bag tails had to be removed manually. In summary, the 8300 series machine exhibited some problems with incomplete bag tail removal as well as seal failures due to bag pull-back. Nevertheless, the 8300 series machine was the most advanced and commercially successful machine of its time, for the automated vacuum packaging of meat products in shrink bags. During at least the past 13 months, the 8300 series machine has been used for the packaging of various meat products in films in which a low Vicat Softening Point metallocene catalyzed film makes up at least 50 weight percent of the film.

Around 1986 the Cryovac Division of W.R. Grace & Co. introduced a next-generation automated rotary chamber machine for the vacuum packaging of meat products, i.e., the 8600 series machine. The 8600 series machine performed the same functions as the 8300 series machine. However, the 8600 series machine had a knife which was separately actuated from a dual clamp/seal-seat member. Moreover, the heat seal member was stationary, positioned below the film directly opposite the clamp/seal-seat member.

In the operation of the 8600 series machine, the clamp/seal-seat member was first deployed downwardly, from above the film. Thereafter, electrical current was supplied to a sealing wire in the heat sealing member, causing the film to be heat sealed. After the current to the seal wire was discontinued, the knife was actuated and the film was cut.

Compared with the 8300 series machine, the 8600 series machine exhibited fewer partially cut-off bag tails. This was due to the fact that the 8600 series machine did not exhibit seal failures due to bag pull-back, or partially cut-off bag tails, because the bag remained clamped by the dual clamp/seal-seat member while the knife made the cut, thereby making bag pull-back impossible, and reducing the number of partially cut-off bag tails.

In spite of the improvements provided by the 8600 machine, problems still existed. One problem was "edge tearing," in which the film "tears" at the seal, i.e., inward from the lay-flat edges of the bag. Edge tearing can be from either side of the lay-flat tubing (or in the center portion of the seal, rather than at the seal edges), and can extend only part of the way across the lay-fat tubing, or all of the way across the lay-flat tubing. If the tearing at the seal is so great that the tear extends the full length of the seal, the result is a problem called an "edge seal". While edge-tear and edge-seal occurred relatively infrequently when sealing traditional bags, recently when running bags containing film which was made from primarily homogeneous polymers (e.g., metallocene catalyzed polymers), and/or with bags made from thinner films, the edge tearing and edge sealing problems have become more frequent and more pronounced. It would therefore be desirable to reduce or eliminate edge-tear and edge-seal, especially for bags made from films containing primarily homogeneous polymers, especially homogeneous polymers which have not been irradiated, or which have been irradiated to only a low dosage level, and/or for bags made from relatively thin films.

The edge tearing and edge sealing problems become more frequent and more pronounced as the cutting knife becomes worn (i.e., more dull) from repeated use. The dull knife problem has been found to be significantly worse for films made from primarily homogeneous polymers (e.g., metallocene catalyzed polymers), and/or with bags made from thinner films. Although exchanging a dull knife for a sharp knife, or resharpening the knife, is a solution to the problem, it is costly, and is only a temporary solution. A better solution to this problem is desired.

SUMMARY OF THE INVENTION

It has been discovered that the edge-tear and edge-seal problems experienced with the 8600 series machine can be reduced or eliminated for all films, including bags made from films containing primarily homogeneous polymers, as well as for bags made from relatively thin films. The solution to the edge-tear and edge-seal has surprisingly been found to be by changing the order of the clamp-seal-cut steps which have been in use on the 8600 series machine. More particularly, it has discovered that by first clamping the film, then cutting the film, and thereafter sealing the film, edge tearing and edge sealing are reduced significantly. Moreover, by employing a dual clamp/seal means, seals which are defective due to pull-back are eliminated.

The edge-tear, edge-seal, incomplete-cut, and frequent knife replacement problems can all be reduced or eliminated through the use of the process of the present invention, in which a clamp-cut-seal process is utilized for the cutting and sealing of the film. Although the process pertains to all areas of flexible film cutting and sealing, it is especially applicable to automated rotary chamber vacuum packaging equipment.

Although not wishing to be confined by theory, the inventors believe that by cutting before sealing, the stretching force which the knife exerts is not enough to cause edge tear or edge seal, even for films of low melting polymers, such as many of the metallocene catalyzed ethylene copolymers, as well as for relatively thin films (which are inherently weak at their still-hot seals). That is, if sealing is carried out before cutting, the still-hot film tends to undergo tearing at the seal, where it is weak because it is still hot from the sealing operation. The heat-induced weakness in the film has still more effect as the knife dulls, causing the knife to exert still more pulling force against the weakened seal area before the cutting is complete.

Thus, it has been discovered that by cutting before sealing, the application of pulling force against a weakened film can be avoided, thereby eliminating edge-tear and edge-seal problems. Moreover, by clamping the film at the location of the seal before the cutting is carried out, pull-back is entirely prevented.

Surprisingly, the problems in the 8600 series machines, i.e., of incomplete bag tail cut-off, edge-tear, edge-seal, and short knife life, can together be reduced by changing the order of operations from clamp-seal-cut to clamp-cut-seal. Even more surprising is the degree of reduction of edge-tear and edge-seal for bags made from films containing primarily homogeneous polymers, as well as relatively thin films. In addition to the above advantages, the present invention can provide a cosmetically more attractive package without the incomplete bag tails and without edge tears. Moreover, the present invention reduces the labor required to locate and remove defective bags, and prevents the formation of leaking bags during the manual removal of the bag tail.

As a first aspect, the present invention is directed to a process for cutting and sealing a film, comprising: (A) clamping at least one film at a first point and a second point, the clamping at the first point being with a means for clamping, and the clamping at the second point being with a means for both clamping and sealing; followed by (B) cutting the film with a cutting knife, the cutting being carried out between the first point and the second point; followed by (C) sealing the film at the second point with the means for both clamping and sealing. Preferably, the film comprises a seal layer having a low Vicat Softening Point, e.g., preferably less than 100° C.; more preferably, less than 90° C. Preferably, the polymer having the having low Vicat Softening Point makes up from 50 to 100 weight percent of the film, more preferably, from about 70 to 100 weight percent; still more preferably, from about 80 to 100 weight percent;

and, yet still more preferably, from about 90 to 100 weight percent. Preferably, the film comprises a seal layer comprising at least one member selected from the group consisting of ethylene homopolymer, ethylene/alpha-olefin copolymer, propylene copolymer, polybutene, polycycloolefin copolymer, styrene copolymer, ethylene/unsaturated ester copolymer, copolyamide, copolyester, polyvinyl chloride, ionomer, and ethylene/vinyl alcohol copolymer; more preferably, at least one member selected from the group consisting of homogeneous ethylene/alpha-olefin copolymer and ethylene/vinyl acetate copolymer. Preferably, the homogeneous ethylene/alpha-olefin copolymer has a density less than 0.91 g/cc. Preferably, the homogeneous ethylene/alpha-olefin copolymer has a density of from about 0.88 to 0.91 g/cc.

Preferably, the film is sealed at the first point. Preferably, the cutting knife travels independent of the clamping and sealing means.

The film can be provided as a continuous tubing, and the process carried out by cutting is across the tubing so that a tubing segment is produced, with the sealing being across the tubing segment, so that an end-seal bag is produced. Preferably, a plurality of end seal bags are produced, configured in a shingled arrangement, and adhered to at least one tape strand (preferably two parallel tape strands) while in the shingled arrangement, in accordance with U.S. Pat. No. 3,552,090, to Roberts et al, hereby incorporated in its entirety, by reference thereto.

The film can be provided in the form of an end-seal bag having a bottom seal and an open top, the product being placed into the bag, with a portion of the bag being cut off so that a shorter bag is produced, followed by making a top seal across the shorter bag so that the product is between the bottom seal and the top seal. Preferably, an atmosphere within the bag is substantially evacuated therefrom before the top seal is made. At least two top seals can be made.

The film can be provided as a continuous, seamless tubing, with a first seal being made across the tubing, and a second seal made across the tubing in spaced relation to the first seal. A first cut can be made across and through the tubing in a location so that the second seal is between the first seal and the first cut, whereby a tubing segment is produced, following which a second cut is made along a seamless edge of the tubing segment, so that a side-seal bag having an open top is produced. Preferably, a plurality of side-seal bags are produced, configured n a shingled arrangement, and adhered to at least one tape strand (preferably two parallel tape strands) while in the shingled arrangement. The process can further comprise placing a product into the side-seal bag, and thereafter cutting off a portion of the bag so that a shorter bag is produced, followed by making a top seal across the shorter bag so that the product is between the seamless bottom and the top seal, Preferably, an atmosphere within the side-seal bag is substantially evacuated therefrom before the top seal is made. At least two top seals can be made.

Preferably, sealing is initiated from about 0.0001 second to about 10 seconds after cutting; more preferably, from about 0.0001 to 1 sec; still more preferably, from about 0.0001 to 0.5 sec; yet still more preferably, from about 0.0001 to 0.3 sec; even yet still more preferably, about 0.2 sec.

Preferably, sealing is carried out by impulse sealing in which current is applied to the seal wire for a time of from about 0.2 sec to about 1 sec; more preferably, from about 0.4 to 0.7 to about sec; still more preferably, from about 0.5 sec to about 0.6 sec.

Preferably, the seal has a width of from about 0.015 inch to about 0.25 inch; more preferably, from about 0.03 inch to about 0.16 inch; still more preferably, from about 0.06 inch to about 0.125 inch; yet still more preferably, about 0.09 inch. The seal wire can have a round cross-section, an oval cross-section, a rectangular cross-section, a flat cross-section, etc. For sealing through a total thickness of from 3 to 6 mils, a round cross-section is preferred.

Preferably, the at least one film has a thickness of from about 0.1 mil to about 50 mils; more preferably, from about 0.2 to 20 mils; still more preferably, from about 0.2 to 3 mils; yet still more preferably, from about 0.2 to 2 mils; even yet still more preferably, from about 1.5 to 2 mils.

As one preferred alternative, the film is a multilayer film comprising: (a) a first layer which is an outer film layer and which serves as a seal layer, and which comprises a homogeneous ethylene/alpha-olefin copolymer having a density of about 0.90 g/cc; (b) a second layer which is an inner film layer film layer and which serves as a bulk layer, and which comprises a homogeneous ethylene/alpha-olefin copolymer having a density of about 0.90 g/cc; (c) a third layer which is an inner film layer and which serves as a tie layer, and which comprises ethylene/vinyl acetate copolymer; (d) a fourth layer which is an inner film layer and which serves as an $O_2$-barrier layer, and which comprises polyvinylidene chloride; (e) a fifth layer which is an inner film layer and which serves as a tie layer, and which comprises ethylene/methyl acrylate copolymer; (f) a sixth layer which is an inner film layer and which serves as a bulk layer, and which comprises homogeneous ethylene/alpha-olefin copolymer having a density of about 0.90 g/cc; and (g) a seventh layer which is an outer film layer and which serves as an abuse-resistant layer, and which comprises heterogeneous ethylene/alpha-olefin copolymer having a density of about 0.92 g/cc. Preferably, the second layer is between the first layer and the third layer; the third layer is between the second layer and the fourth layer; the fourth layer is between the third layer and the fifth layer; the fifth layer is between the fourth layer and the sixth layer; and the sixth layer is between the fifth layer and the seventh layer.

Preferably, the film is a heat-shrinkable film.

Preferably, sealing is carried out by contacting the at least one film with a seal wire, so that a heat seal is formed.

As a second aspect, the present invention is directed to a packaged product produced by a process in accordance with the present invention, as set forth above. Preferably, the process is a preferred process in accordance with the present invention. Preferably, the product comprises food; more preferably, at least one member selected from the group consisting of beef, pork, poultry, fish, cheese, smoked and processed meat, and cheese.

DETAILED DESCRIPTION OF THE INVENTION

Figure 1:
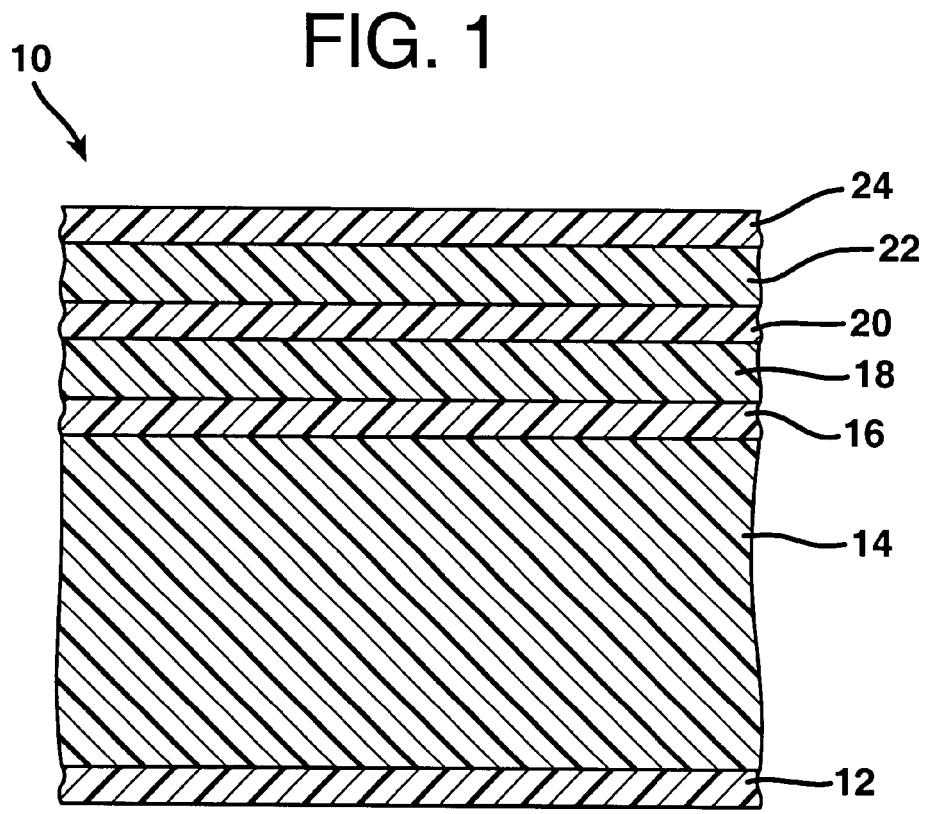
FIG. 1 illustrates an enlarged cross-sectional view of a first preferred multilayer film for use in the process of the present invention.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the phrases "seal layer", "sealing layer", "heat seal layer", and "sealant layer", refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers adjacent this sealant layer, the inside layer frequently also serving as a food contact layer in the packaging of foods. Preferably, a sealant layer to be sealed by heat-sealing can comprise any thermoplastic polymer; more preferably, the heat-sealing layer comprises, for example, thermoplastic polyolefin, thermoplastic polyamide, thermoplastic polyester, and thermoplastic polyvinyl chloride; still more preferably, thermoplastic polyolefin; yet still more preferably, thermoplastic ethylene/alpha-olefin having less than 60 weight percent crystallinity. Preferred sealant compositions are the same as the compositions for an abuse layer.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a heated bar, hot air, infrared radiation, ultrasonic sealing, etc. As used herein, the phrase "means for sealing" refers to any suitable means for sealing a film to itself, another film, or a different article. Means for sealing include means for heat sealing, such as impulse sealing means; $R_f$ sealing means, ultrasonic sealing means, etc.

As used herein, the phrase "sealing is initiated" refers to heating the film to a substantially elevated temperature, preferably by contacting the film with a solid member (e.g., a heat seal wire). In one method, sealing is initiated by contacting the film with the means for sealing which is at ambient temperature. In this case, the moment at which sealing is initiated is the moment at which the means for sealing begins to apply heat to the film. In another method, the means for sealing could be preheated before it is brought into contact with the film, so that upon contact with the film it immediately begins to apply heat to the film. In this case, the moment at which sealing is initiated is the moment at which the preheated means for sealing contacts the film. Regardless of which of the above alternatives is utilized, in the "initiation of sealing after cutting," the phrase "to apply heat to the film" requires the application of enough heat that at least a portion of the sealing layer of the film reaches the glass transition temperature of at least one of the polymers making up the seal layer of the film. Preferably, sealing is initiated by the application of enough heat that edge tearing would occur if a clamp-seal-cut process is utilized with a relatively dull knife, i.e., a knife which has been used to cut at least 100,000 bags.

As used herein, the phrase "substantially evacuated" is used with reference to a bag which has had atmospheric gases removed therefrom. Preferably, the bag has been evacuated to a level of at least 50 torr; more preferably, from about 1 to 40 torr; still more preferably, the bag has been evacuated to a level of from about 1 to 15 torr.

As used herein, the phrase "factory seal" refers to any and all seals necessary to convert a film tubing or flat film into a bag having an open top. Such seals are usually made at a bag-making factory, rather than at location at which products are being packaged. Hence the name, "factory seal."

As used herein, the phrase "means for cutting" refers to any suitable means for cutting film, including especially a knife, but further including other means as known to those of skill in the art, such a hot wire, laser, etc. Preferably, the cutting means comprises a cutting knife, i.e., a sharpened blade. A preferred cutting knife can be obtained from W.R. Grace & Co. of Duncan, South Carolina.

As used herein, the term "barrier", and the phrase "barrier layer", as applied to films and/or film layers, is used with reference to the ability of a film or film layer to serve as a barrier to one or more gases. Oxygen (i.e., $O_2$) barrier layers can comprise, for example, ethylene/vinyl alcohol copolymer, polyvinyl chloride, polyvinylidene chloride, polyamide, polyester, polyacrylonitrile, etc., as known to those of skill in the art, preferably, the oxygen barrier layer comprises ethylene/vinyl alcohol copolymer, polyvinyl chloride, polyvinylidene chloride, and polyamide; more preferably, vinylidene chloride/methyl acrylate copolymer, as known to those of skill in the art.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal; preferably, abuse layers comprise polymer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/ methyl acrylate copolymer, and ethylene/butyl acrylate copolymer, etc. as known to those of skill in the art; more preferably, ethylene/vinyl acetate copolymer and ethylene/ alpha-olefin copolymer having a density of from about 0.91 to 0.93; still more preferably, the abuse layer of the bag film comprises 85–100 weight percent ethylene/vinyl acetate copolymer, and 0–15 weight percent LLDPE, while the still more preferred abuse layer of the patch film comprises 85–100 weight percent LLDPE and 0–15 weight percent ethylene/vinyl acetate copolymer having a vinyl acetate content of about 9 percent.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/ or specific impermeability.

As used herein, the phrase "skin layer" refers to an outside layer of a multilayer film in packaging a product, this skin layer being subject to abuse. Accordingly, the preferred polymers for the skin layer are the same as the preferred polymers for the abuse layer.

As used herein, the phrase "tie layer" refers to any internal layer having the primary purpose of adhering two layers to one another. Tie layers can comprise any polymer having a polar group grafted thereon, so that the polymer is capable of covalent bonding to polar polymers such as polyamide and ethylene/vinyl alcohol copolymer; preferably, tie layers comprise at least one member selected from the group consisting of polyolefin, modified polyolefin, ethylene/vinyl acetate copolymer, modified ethylene/vinyl acetate copolymer, and homogeneous ethylene/alpha-olefin copolymer; more preferably, tie layers comprise at least one member selected from the group consisting of anhydride modified grafted linear low density polyethylene, anhydride grafted low density polyethylene, homogeneous ethylene/ alpha-olefin copolymer, and anhydride grafted ethylene/ vinyl acetate copolymer.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc. Preferably, bulk layers comprise polyolefin; more preferably, at least one member selected from the group consisting of ethylene/alpha-olefin copolymer, ethylene/alpha-olefin copolymer plastomer, low density polyethylene, and linear low density polyethylene.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, copolymers are identified, i.e, named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "polymerization units" derived from the monomers from which the copolymer is produced.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER (TM) ethylene/alpha-olefin copolymers produced by Mitsui Petrochemical Corporation), heterogeneous polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum, as is disclosed in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.,* Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably the homogeneous copolymer has a DSC peak Tm of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene- 1, i.e., 1-butene, 1-hexene, and 1-octene, respectively. Most preferably, the alpha-olefin comprises octene-1, and/or a blend of hexene- 1 and butene-1.

Processes for preparing and using homogeneous polymers are disclosed in U.S. Pat. Nos. 5,206,075, 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT (TM) resins obtainable from the Exxon Chemical Company, and TAFMER (TM) resins obtainable from the Mitsui Petrochemical Corporation. All these materials generally include copolymers of ethylene with one or more comonomers selected from $C_4$ to $C_{10}$ alpha-olefin such as butene-1 (i.e., 1 -butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY (TM) resins, are also included as another type of homogeneous ethylene alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the term "adhered" is inclusive of films which are directly adhered to one another using a heat seal or other means, as well as films which are adhered to one another using an adhesive which is between the two films.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm ×10 cm specimen of film, when subjected to selected heat, as measured by ASTM D 2732, as known to those of skill in the art. As used herein, the phrase "heat shrinkable" is used with reference to films which exhibit a free shrink at 185° F. of at least 5% or more in at least one direction, i.e., MD or TD. Films used in the process of the present invention preferably have a free shrink at 185° F. of at least 10 percent in at least one direction.

Although the films used in the present invention can be monolayer films or multilayer films, preferably the film is a multilayer film comprising an O2-barrier layer. Preferably, the film has a total of from 2 to 20 layers; more preferably, from 2 to 12 layers; and still more preferably, from 4 to 9 layers.

In general, the film(s) used in the present invention can have any total thickness desired, so long as the film provides the desired properties for the particular packaging operation in which the film is used, e.g. abuse-resistance (especially puncture-resistance), modulus, seal strength, optics, etc.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

The multilayer films used in the present invention are preferably irradiated to induce crosslinking, as well as corona treated to roughen the surface of the films which are to be adhered to one another. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons is in the range of up to about 12 MR, more preferably about 2 to about 9 MR, and still more preferably, about 3 MR. Preferably, irradiation is carried out by an electron accelerator and the dosage level is determined by standard dosimetry methods.

Other accelerators such as a Vander Graff or resonating transformer may be used. The radiation is not limited to electrons from an accelerator since any ionizing radiation may be used. The unit of ionizing radiation generally used is the rad, hereinafter referred to as "RAD", which is defined as the amount of radiation which will result in the absorption of 100 ergs of energy per gram of irradiated material. The megarad, hereinafter referred to as "MR", is one million ($10^6$) RAD. The ionizing radiation crosslinks the polymers in the film. Preferably, the film is irradiated at a level of from 2–15 MR, more preferably 2–10 MR, still more preferably, about 7 MR. As can be seen from the descriptions of preferred films for use in the present invention, the most preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

In general, sealing and cutting of tubing to produce bags is disclosed in U.S. Pat. Nos. 3,552,090, 3,383,746, and U.S. Ser. No. 844,883, filed Jul. 25, 1969, to OWEN, each of these two U.S. Patents as well as the U.S. Patent application, hereby being incorporated by reference thereto, in their entireties.

Figure 4:
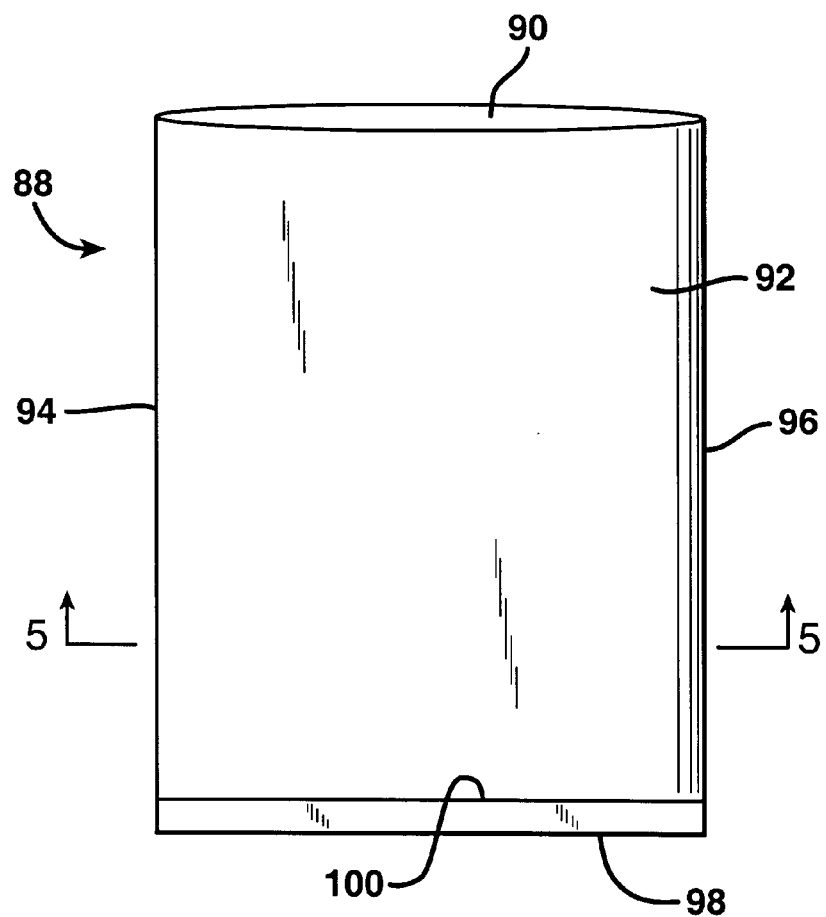
FIG. 4 illustrates a schematic of an end-seal bag in lay-flat view.
Figure 5:
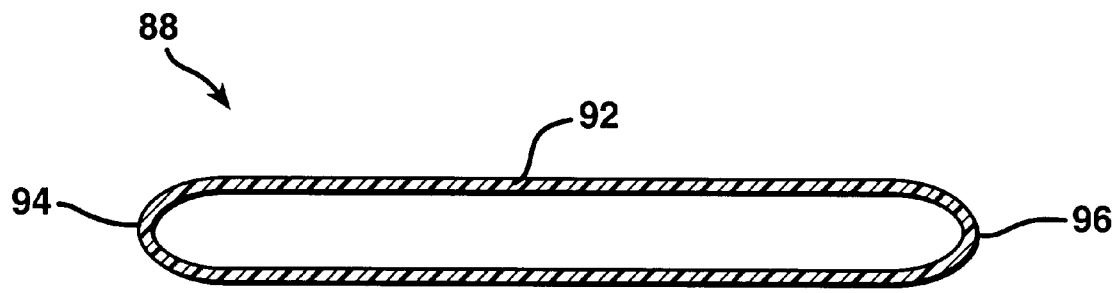
FIG. 5 illustrates a cross-sectional view through section 5—5 of FIG. 4.

FIG. 4 illustrates a lay-flat view of conventional end-seal bag 88, which can be used in the process of the present invention. End-seal bag 88 is made from seamless tubular film 92, and has open top 90, first and second lay-flat side edges 94 and 96, bottom edge 98, and end-seal 100. FIG. 5 illustrates a cross-sectional view of end-seal bag 88 taken through section 5—5 of FIG. 4.

Figure 6:
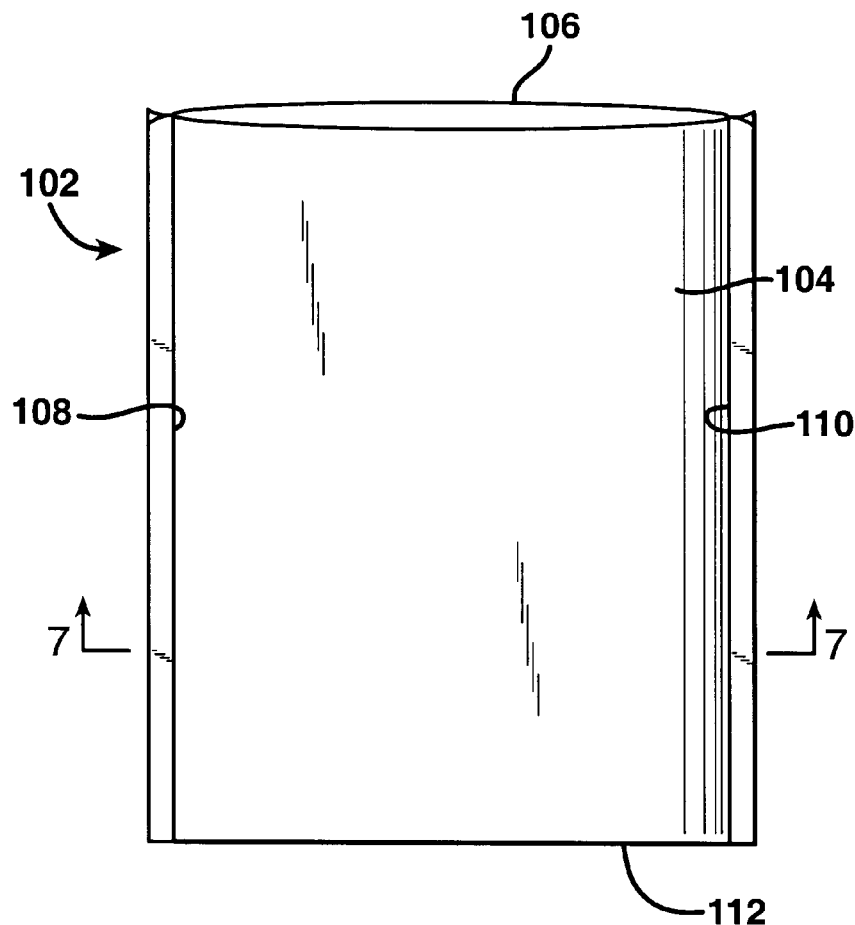
FIG. 6 illustrates a schematic of a side-seal bag in lay-flat view.
Figure 7:
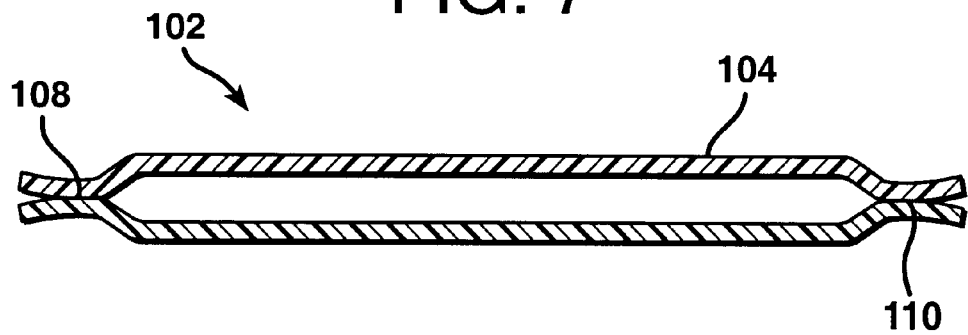
FIG. 7 illustrates a cross-sectional view through section 7—7 of FIG. 6.

FIG. 6 illustrates a lay-flat view of conventional side-seal bag 102, which can also be used in the process of the present invention. Side-seal bag 102 is made from dual-seamed tubular film 104, and has open top 106, first and second side seals 108 and 110, and bottom edge 112. FIG. 7 illustrates a cross-sectional view of side-seal bag 102, taken through section 7—7 of FIG. 6.

Film Nos. 1 and 2

Film Nos. 1 and 2, each of which was a seven-layer film, are preferred multilayer films for use in the process of the present invention. Film Nos. 1 and 2 were identical in composition an thickness, except that in the production of Film No. 1, the substrate layers were irradiated to a level of 70 kiloGrays (kGy), whereas in Film No. 2, the substrate layers were irradiated to a level of 90 kGy.

FIG. 1 illustrates a cross-sectional view of multilayer film 10, which is illustrative of the cross-sectional view of Film Nos. 1 and 2. Layers 12–24, illustrated in FIG. 1 and described in Table I below, disclose the function, composition, and relative thickness of each of layers 12–24.

TABLE I

| Layer No. | Layer Function | Layer Chemical Identity | Layer Thickness (% of total film thickness) |
|---|---|---|---|
| 24 (97) | outside, grease-resistant, and abuse-resistant | 78% heterogeneous ethylene/alpha-olefin #1; & 22% homogeneous ethylene/alpha-olefin #2 | 6.2 |
| 22 (96) | bulk | homogeneous ethylene/alpha-olefin #4 | 11.2 |
| 20 (95) | tie | EMA #1 | 4.2 |
| 18 (94) | $O_2$-barrier | PVDC Blend #1 | 9 |
| 16 (93) | tie | irradiated EVA #1 | 4.2 |
| 14 (92) | bulk | irradiated homogeneous ethylene/alpha-olefin #4 | 40.3 |
| 12 (93) | inside, seal, and abuse-resistant | irradiated homogeneous ethylene/alpha-olefin #3 | 6.0 |

Heterogeneous ethylene/alpha-olefin #1 was ESCORENE LL3003.32 ethylene/alpha-olefin copolymer, having a density of 0.918 g/cc and a melt index of 3.2, obtained from the Exxon Chemical Company, of Baytown, Tex.

Homogeneous ethylene/alpha-olefin #2 was TAFMER XR 107L (TM) linear homogeneous ethylene/alpha-olefin copolymer plastomer resin having a density of 0.89 g/cc and a melt flow index of 7.0, this polymer being produced by Mitsui Sekka, of Japan, and obtained from the Mitsui Petrochemicals (America), Ltd., of N.Y., N.Y.

Homogeneous ethylene/alpha-olefin copolymer #3 was AFFINITY PL 1280 substantially linear long chain branched ethylene/alpha-olefin copolymer, having a density of 0.900 g/cc and a melt index of 6.0, obtained from The Dow Chemical Company, of Midland, Mich.

Homogeneous ethylene/alpha-olefin #4 was XU59220.04, a proprietary experimental substantially linear long chain branched homogeneous ethylene /alpha-olefin copolymer having a density of 0.895 g/cc and a melt index of 0.9, obtained under a development agreement with The Dow Chemical Company of Midland, Mich. The information concerning XU59220.04 and the film and bag containing the experimental polymer which are set forth in this example have been approved for release by Dow. "EMA #1" was SP2305 (TM) ethylene/methyl acrylate copolymer having a methyl acrylate content of 20%, obtained from the Chevron Chemical Company, of Houston, Tex.

EVA #1 was ESCORENE XV65.93 (TM) ethylene/vinyl acetate copolymer having a vinyl acetate content of 15%, obtained from Exxon Chemical, of Baytown, Tex. EVA #2 was ELVAX 3175 GC (TM) ethylene/vinyl acetate copolymer having a vinyl acetate content of 28 weight percent, also obtained from E.I. DuPont de Nemours, of Wilmington, Del.

PVDC Blend #1 was a composition comprising: (a) about 96 weight percent DOW MA134 (TM) vinylidene chloride/methyl acrylate copolymer having a methyl acrylate content of 8.5%, obtained from The Dow Chemical Company, of Midland, Mich.; (b) about 2 weight percent PLAS CHEK 775 (TM) epoxidized soybean oil, obtained from Ferro Chemicals, of Bedford, Ohio; and, (c) about 2 weight percent METABLEN L1000 (TM) acrylate blend, obtained from Elf Atochem, of Philadelphia, Pa. METABLEN L1000 (TM) comprises about 53 weight percent methyl methacrylate ("MMA"), 29 weight percent butyl methacrylate ("BMA"), and 19 weight percent butyl acrylate ("BA").

Figure 2:
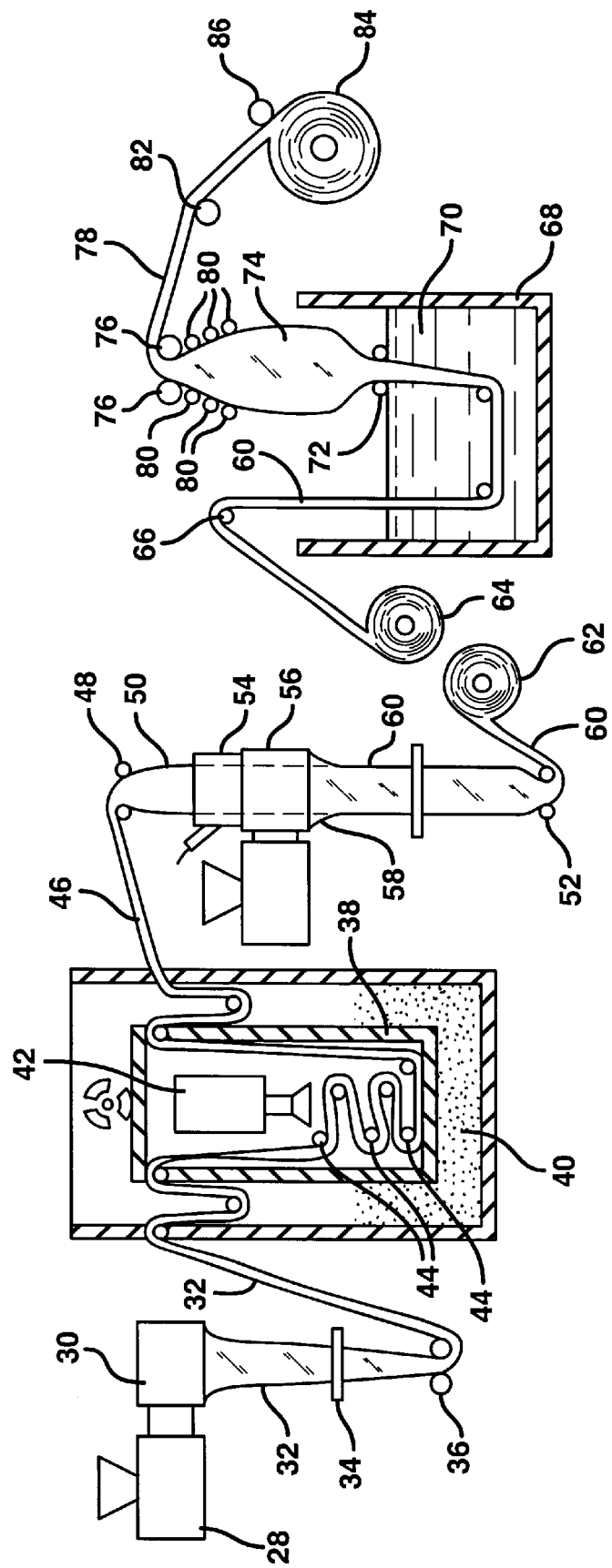
FIG. 2 illustrates a schematic view of a process for making the film illustrated in FIG. 1.

Film 10 had a thickness of 1.75 mils, and a total free shrink, at 185° F., of 100 to 107%. Furthermore, the film was produced in accordance with a process schematically illustrated in FIG. 2. In the process illustrated in FIG. 2, solid polymer beads (not illustrated) are fed to a plurality of extruders 28 (for simplicity, only one extruder is illustrated). Inside extruders 28, the polymer beads are forwarded, melted, and degassed, following which the resulting bubble-free melt is forwarded into die head 30, and extruded through an annular die, resulting in tubing 32 which is preferably about 24 mils thick.

After cooling or quenching by water spray from cooling ring 34, tubing 32 is collapsed by pinch rolls 36, and is thereafter fed through irradiation vault 38 surrounded by shielding 40, where tubing 32 is irradiated with high energy electrons (i.e., ionizing radiation) from iron core transformer accelerator 42. Tubing 32 is guided through irradiation vault 38 on rolls 44. Preferably, tubing 32 is irradiated to a level of from about 3 to 8 MR.

After irradiation, irradiated tubing 46 is directed through pinch rolls 48, following which irradiated tubing 46 is slightly inflated, resulting in trapped bubble 50. However, at trapped bubble 50, the tubing is not significantly drawn longitudinally, as the surface speed of nip rolls 52 are about the same speed as nip rolls 48. Furthermore, irradiated tubing 46 is inflated only enough to provide a substantially circular tubing without significant transverse orientation, i.e., without stretching.

Slightly inflated, irradiated tubing 50 is passed through vacuum chamber 54, and thereafter forwarded through coating die 56. Second tubular film 58 is melt extruded from coating die 56 and coated onto slightly inflated, irradiated tube 50, to form two-ply tubular film 60. Second tubular film 58 preferably comprises an $O_2$-barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 60 is wound up onto windup roll 62. Thereafter, windup roll 62 is removed and installed as unwind roll 64, on a second stage in the process of making the tubing film as ultimately desired. Two-ply tubular film 60, from unwind roll 64, is unwound and passed over guide roll 66, after which two-ply tubular film 60 passes into hot water bath tank 68 containing hot water 70. The now collapsed, irradiated, coated tubular film 60 is submersed in hot water 70 (having a temperature of about 185° F.) for a retention time of at least about 30 seconds, i.e., for a time period in order to bring the film up to the desired temperature for biaxial orientation. Thereafter, irradiated tubular film 60 is directed through nip rolls 72, and bubble 74 is blown, thereby transversely stretching tubular film 60. Furthermore, while being blown, i.e., transversely stretched, nip rolls 76 draw tubular film 60 in the longitudinal direction, as nip rolls 76 have a surface speed higher than the surface speed of nip rolls 72. As a result of the transverse stretching and longitudinal drawing, irradiated, coated biaxially-oriented blown tubing film 78 is produced, this blown tubing preferably having been both stretched in a ratio of from about 1:1.5–1:6, and drawn in a ratio of from about 1:1.5–1:6. More preferably, the stretching and drawing are each performed a ratio of from about 1:2–1:4. The result is a biaxial orientation of from about 1:2.25–1:36, more preferably, 1:4–1:16. While bubble 74 is maintained between pinch rolls 72 and 76, blown tubing 78 is collapsed by rolls 80, and thereafter conveyed through pinch rolls 76 and across guide roll 82, and then rolled onto wind-up roll 84. roll 86 assures a good wind-up.

Film No. 3

Figure 3:
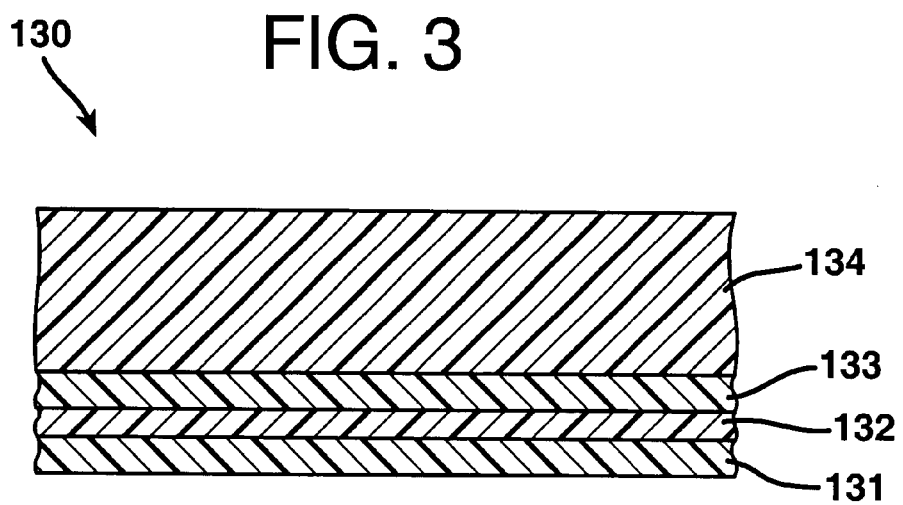
FIG. 3 illustrates an enlarged cross-sectional view of an alternative multilayer film for use in the process of the present invention.

FIG. 3 is a schematic cross-sectional view of multilayer film 130, which is representative of the cross-section of comparative Film No. 3, which contains layers 131–134. Film No. 3 was also produced by the process illustrated in FIG. 2. Film No. 3 was a four-layer film having a thickness of 2 mils and a total of four layers, and had a physical structure, in terms of layer arrangement, function, chemical composition, and thickness, as set forth in Table II, below.

TABLE II

| Layer No. | Layer Function | Layer Chemical Identity | Layer Thickness (% of total film thickness) |
|---|---|---|---|
| 134 | outside, grease-resistant, abuse-resistant, and tie | 92.5% EVA #2 & 7.5% LLDPE #1 | 0.50 |
| 133 | $O_2$-barrier | PVDC Blend #1 | 0.20 |
| 132 | bulk & tie | irradiated EVA #3 | 1.0 |
| 131 | inside, seal, and grease-resistant | 90% irradiated EVA #4 & 10% irradiated LLDPE #1 | 0.29 |

EVA #2, in layer 134, was LD-318.92 ethylene/vinyl acetate copolymer having a vinyl acetate content of 9%, a melt index of 2.0, and a density of 0.93 g/cc, and was also obtained from the Exxon Chemical Company;

EVA #3, in layer 132, was ESCORENE LD-720.92 ethylene/vinyl acetate copolymer having a vinyl acetate content of 19%, a density of 0.94 g/cc, and a melt index of 1.5, and was obtained from the Exxon Chemical Company;

EVA #4, in layer 131, was PE3507-2 (TM) ethylene/vinyl acetate copolymer having a vinyl acetate content of 6.2%, a density of 0.93 g/cc, a melt index of 2.5, obtained from DuPont de Nemours, of Wilmington, Del.; and LLDPE #1, in layers 131 and 134, was DOWLEX 2045 (TM) linear low density polyethylene, having a density of 0.92 g/cc, obtained from The Dow Chemical Co., of Midland, Mich.; and PVDC Blend #1 was as identified in Film No. 1, above.

Film Nos. 1, 2, and 3, in the form of seamless tubing, were converted into end-seal bags. FIG. 4 illustrates a lay-flat view of conventional end-seal bag 88, which can be used in the process of the present invention. End-seal bag 88 is made from seamless tubular film 92, and has open top 90, first and second lay-flat side edges 94 and 96, bottom edge 98, and end-seal 100. FIG. 5 illustrates a cross-sectional view of end-seal bag 88 taken through section 5—5 of FIG. 4.

Although it was not done, Film Nos. 1, 2, and 3, in the form of seamless tubing, could have been converted into side-seal bags. FIG. 6 illustrates a lay-flat view of conventional side-seal bag 102, which can also be used in the process of the present invention. Side-seal bag 102 is made from dual-seamed tubular film 104, and has open top 106, first and second side seals 108 and 110, and bottom edge 112. FIG. 7 illustrates a cross-sectional view of side-seal bag 102, taken through section 7—7 of FIG. 6.

The Sealing and Cutting Performance of Film Nos. 1, 2 and 3

Seamless tubing of Film Nos. 1, 2, and 3 were converted into end-seal bags in a conventional manner, i.e., a manner as known to those of skill in the art of bagmaking. The resulting end-seal bags were tested to see how well the open end of the bag could be sealed in an 8600 series automated rotary chamber machine for the vacuum packaging of meat products.

Figure 8:
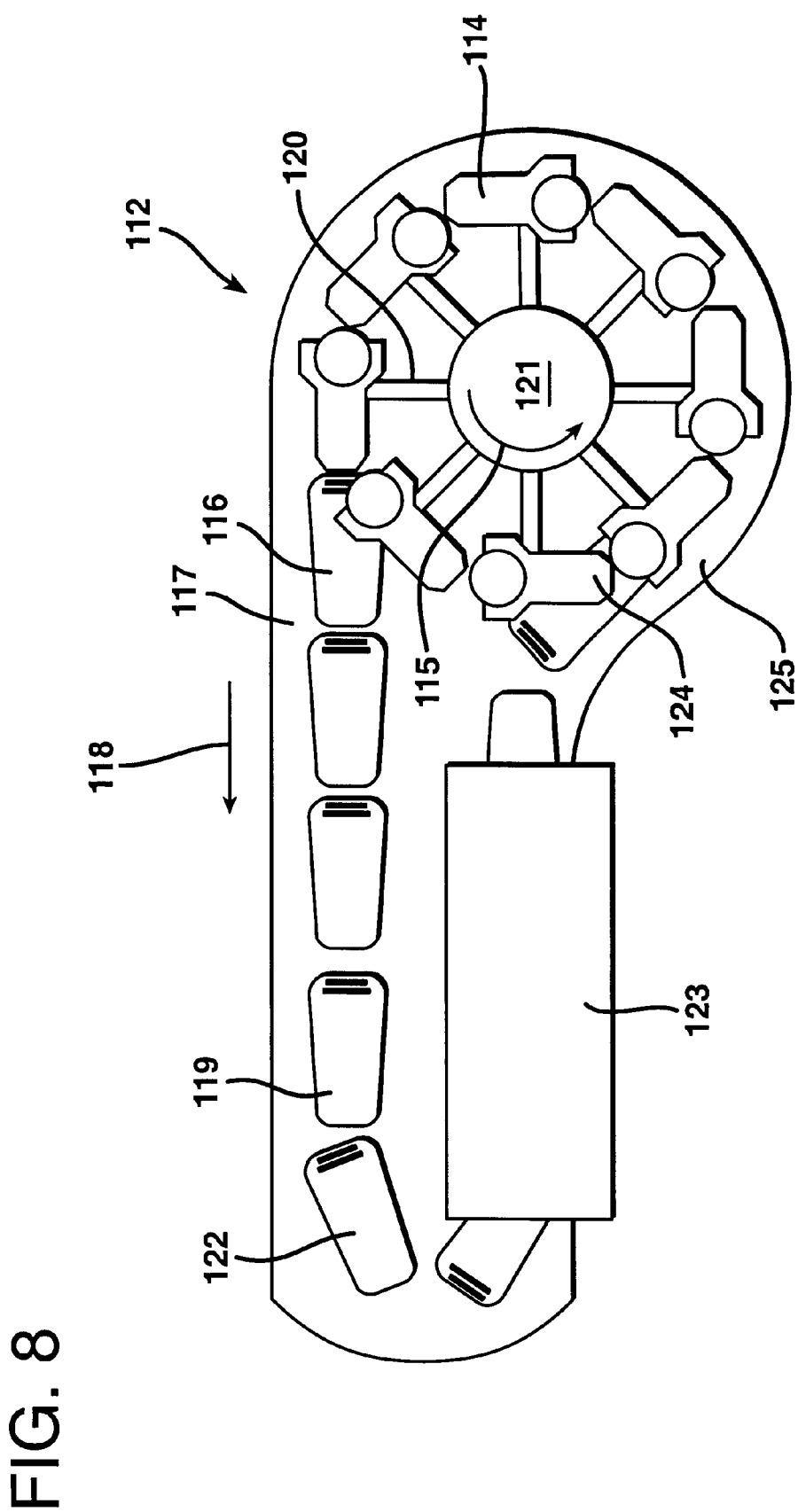
FIG. 8 illustrates a schematic view of an 8600 series automated rotary chamber vacuum bag packaging machine.

FIG. 8 illustrates a schematic view of rotary vacuum chamber packaging machine 112, in accordance with U.S.

Pat. No. 4,550,548, hereby incorporated by in its entirety, by reference thereto. Machine 112 includes a plurality of vacuum chambers 114, which are moved serially and continuously around a closed path in the direction indicated by arrow 115. Chamber 116 is shown as positioned on the path at location 117 where a vacuum packaging cycle is complete. At this point, the base or platen of the vacuum chamber then supporting a vacuum packaged article is separated from its vacuum chamber by being shunted away from the closed path along a shunt path progressing in the direction of arrow 118. Shunted platens move continuously along the shunt path, passing through a package discharge station located for example in the vicinity of platen 119 where the packaged article is transferred to an outfeed conveyor (not shown) by tilting the respective platen. Separation of a vacuum chamber platen from its vacuum chamber at location 117 may be accomplished by lifting the respective vacuum chamber with an integral hinged arm 120 stemming from a rotatively driven column 121 at the center of the closed path. The respective platen being empty after passing the discharge station continues around the shunt path to a loading station for example being located in the vicinity of platen 122 where a loosely bagged article to be vacuum packaged is placed on the moving platen. A platen such as 122 then having placed thereupon a loosely bagged article continues along the shunt path through hot air shrink tunnel 123 to synchronously merge with an empty vacuum chamber 124 advancing around the closed path at location 125. This merger is accomplished by an operation inverse to the shunt separation operation discussed above. At this point, a vacuum packaging cycle begins. With each revolution of a vacuum chamber around the closed path a vacuum packaging cycle is completed over the path segment that extends from location 125 around to location 117. From location 117 around to location 125 a vacuum chamber will continue to advance but will be between packaging cycles. The packaging cycle carried out within each vacuum chamber includes conventional well known steps as discussed, for example, in U.S. Pat. No. 3,958,391, to Kujubu, hereby also incorporated in its entirety, by reference thereto. Conventionally, these steps include vacuumizing the vacuum chamber whereupon the bag lying loosely about the contained article to be packaged collapses onto the contained article as evacuation of air from within the bag proceeds. Finally, the evacuated bag is heat sealed in-chamber at its open end.

In the testing of end-seal bags from Film Nos. 1, 2, and 3, a test product (a 4"×6"1" plastic block, to simulate a product) was placed inside the bag which was fed into the vacuum chamber of an 8600 series automated rotary chamber machine, i.e., as illustrated in FIG. 8, described above. Pork fat and pork purge was rubbed across the seal area to simulate contamination. Finally, a fold was put in the bag to simulate the sealing of a wrinkled bag. Together, these conditions simulated a worst-case scenario. The end-seal bag, having the block therein, was fed into the 8600 series automated rotary chamber machine, a portion of the bag which was to be cut and sealed was placed under tension between two clamping means, the bag was punctured by a bag puncturing means so that vacuum could be obtained within the bag, and vacuum was thereafter drawn in the chamber, and inside the bag.

Figure 9:
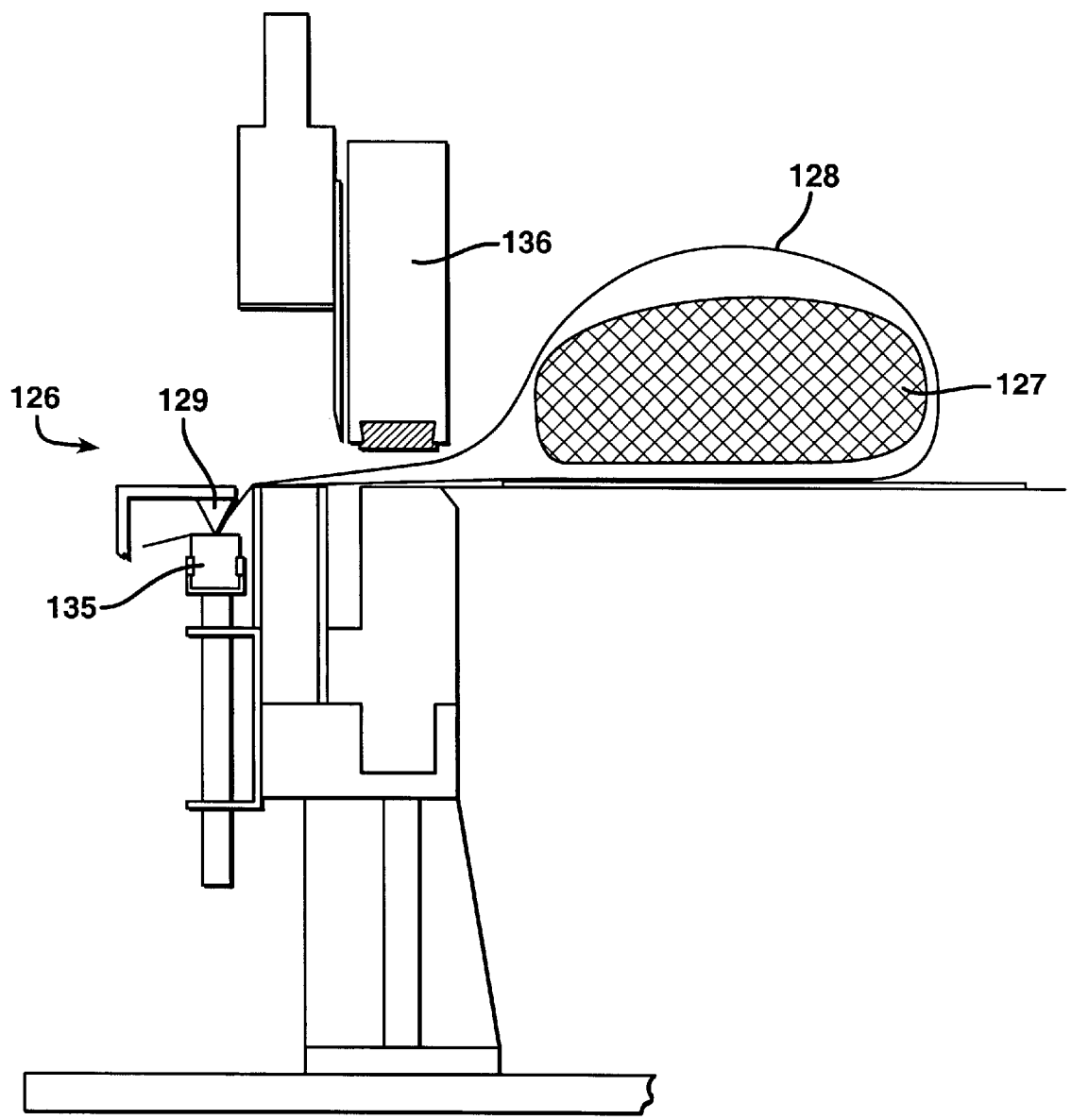
FIG. 9 illustrates an enlarged schematic view of a cutting and sealing portion of the automated rotary chamber vacuum bag packaging machine illustrated in FIG. 8, with the chamber in the down position.
Figure 10:
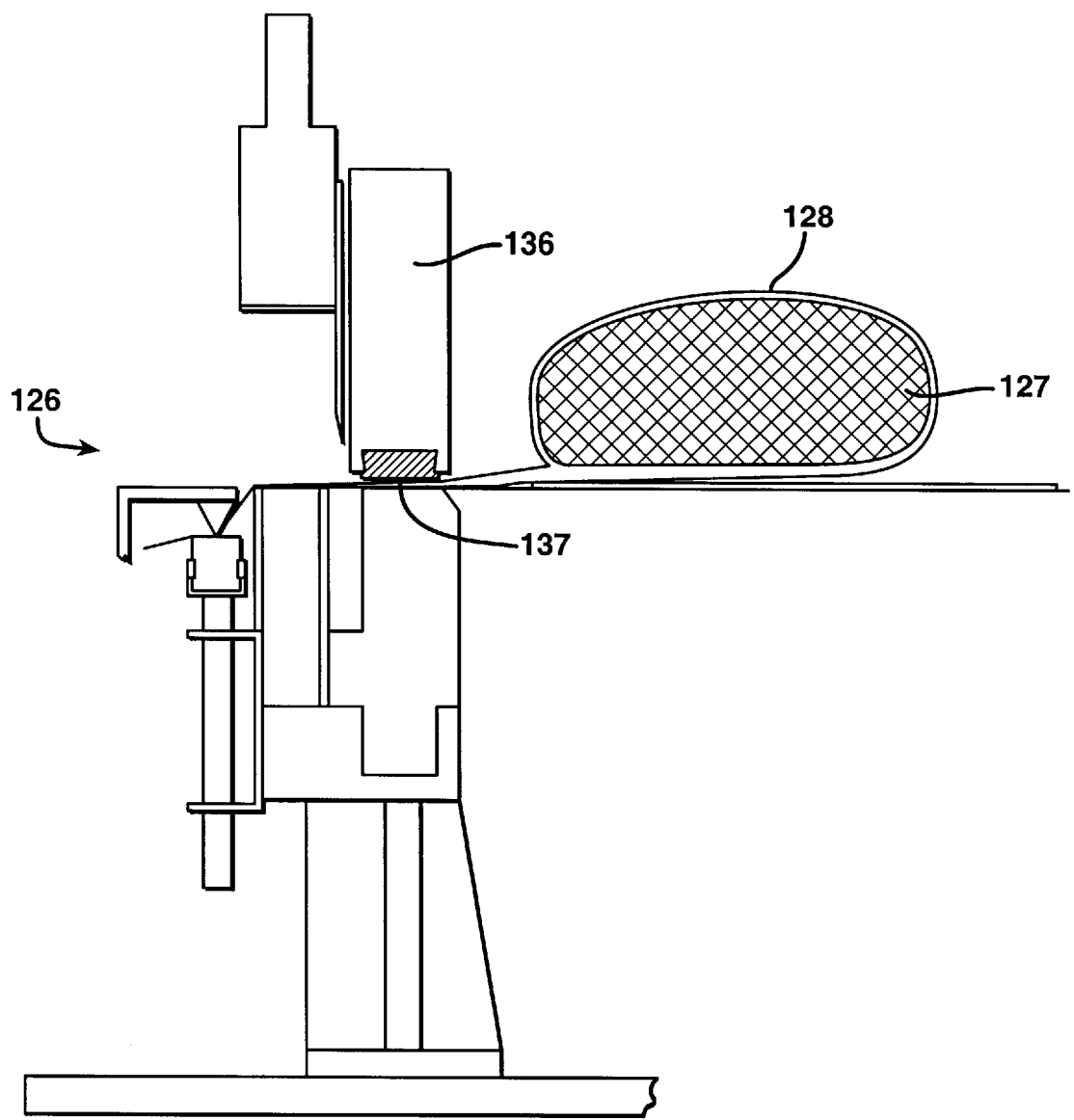
FIG. 10 illustrates the enlarged schematic view illustrated in FIG. 9, with the seal bar in the down position.
Figure 11:
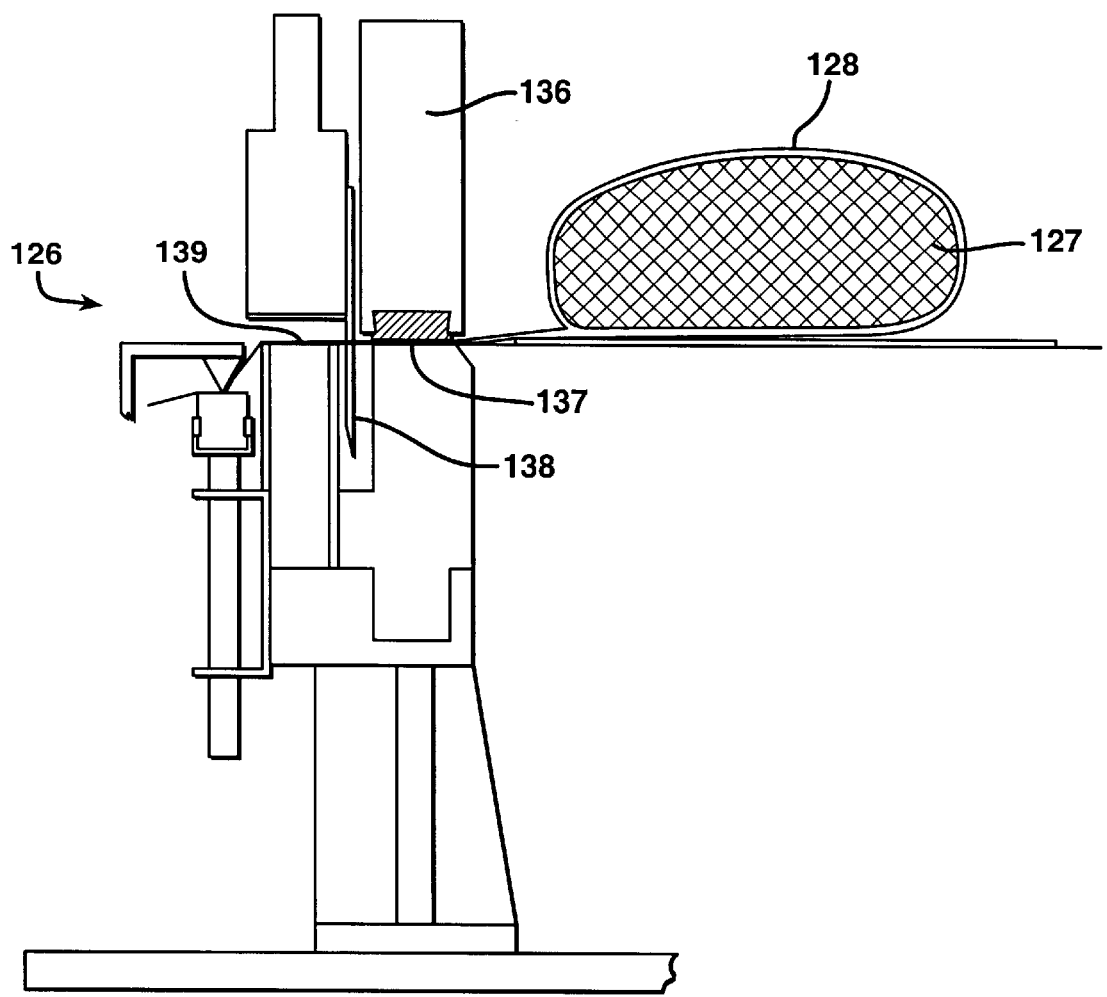
FIG. 11 illustrates the enlarged schematic view illustrated in FIG. 9, with the knife in the down position.

Thereafter, the evacuated bag, having the sponge therein, was either: (a) cut-and-thereafter-sealed (i.e., "YES," in Table III below, which is the invention), or (b) sealed-and-thereafter cut (i.e., "NO," in Table III below, which is a comparative based on the prior art operation of the 8600 machine). FIGS. 9, 10, and 11 illustrate a schematic view of portion 126 of the 8600 machine which clamps, cuts, and seals a bag (e.g., 128) having an article (e.g., 127) therein. FIG. 9 illustrates bag 128 clamped near its open end by chamber lid member 129 and chamber base 135. Once clamped by the shut lid of the chamber, holes (not shown) are punched near the clamped end, in order to provide a path for escape of gas to prevent ballooning of the bag. After gas has been evacuated from the chamber, including the bag, seal seat 136 moves downward and contacts the bag, clamping the bag between seal seat 136 and heat seal wire 137, as illustrated in FIG. 10. Shortly thereafter, as illustrated in FIG. 11, knife 138 is moved downward, severing the tail end 139 from the remainder of bag 128, which contains product 127. of bag 1. After cutting,has been performed, an electrical impulse is passed through heat seal wire 137, causing it to get hot enough that bag 128 is sealed thereacross. The process schematically illustrated in FIGS. 9–11, and described above, is a clamp-cut-seal process in accordance with the process of the present invention. It should be noted that the 8600 series rotary vacuum chamber packaging machine is capable of independent movement of the cutting knife 138 and seal seat 136, unlike the older 8300 series rotary vacuum chamber packaging machine. Without modification, the 8300 series machine is not capable of carrying out the process of the present invention.

As can be clearly seen from the data in Table III, below, by clamping, followed by cutting before sealing, the occurrence of edge seals was consistently eliminated. The benefit was clearly the greatest for Film Nos. 1 and 2, which contain primarily low melting polymers, i.e., ethylene/unsaturated ester copolymers and metallocene-catalyzed homogeneous ethylene/alpha-olefin copolymers. Using the process of the invention, the reduction in edge seals and incomplete bag tail cut-off is especially dramatic for such films. However, even for more conventional films, such as Film No. 3, the occurrence of edge seals and incomplete bag tail cut-off is also improved.

The comparatives (i.e., the "NO" examples) were carried out using the same equipment and the same seal temperature and pressure and sealing time as in the cut-before-seal examples (i.e., the "YES" examples). In the comparative examples, sealing was carried out by passing current at 32 volts through seal wire 137 for about 0.5 second, followed by a film cooling pause of_second before the cutting knife was actuated to cut the film. During the film cooling the flow of current through seal wire 137 was discontinued.

TABLE III

| Film No. | Cut-Before-Seal? | Occurrence of Edge Seals (%) | Occurrence of Incomplete Bag Tail Cut-Off (%) | Seal Failures, i.e., leaking seal (%) | No. of Bags Tested |
| --- | --- | --- | --- | --- | --- |
| 1 | YES | 0 | 2 | 0 | 50 |
| 1 | NO | 76 | 100 | — | 50 |
| 2 | YES | 0 | 2 | 18 | 50 |
| 2 | NO | 52 | 44 | — | 50 |
| 3 | YES | 0 | 0 | 44 | 50 |
| 3 | NO | 6 | 2 | — | 50 |

The above results to be surprising and unexpected, especially in degree. Automated packaging equipment has operated for years with the detriments of clamp-seal-cut, with the additional detriment of having to wait until the seal cooled enough to allow the cut to be made. Surprisingly, the problems of incomplete tail cut-off and edge seals (the figures for edge seal in Table III above represent the sum of edge tear and edge seal) can be virtually eliminated by clamping and then cutting before sealing. Moreover seal failure due to pull-back was not observed. The seal failure which was observed occurred for other reasons.

It was also surprising that the low-melting ethylene/alpha-olefin copolymers experienced greatly increased incomplete bag tail cut-off and increased edge seals relative to heterogeneous polymers. It was also surprising that these increased problems could be reduced to the point of virtual elimination by changing from a clamp-seal-cut method to a clamp-cut-seal method.

Figure 12:
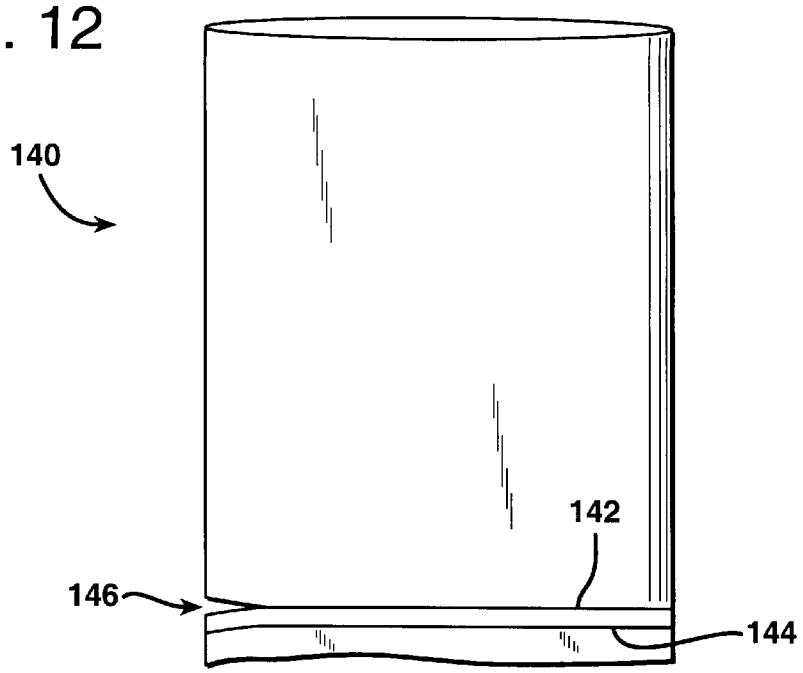
FIG. 12 illustrates a defective end-seal bag having edge tear.

FIG. 12 illustrates defective end-seal bag 140, which has two parallel end seals 142 and 144. At location 146 an edge tear has occurred. Such edge tears are frequent when clamp seal and cut processes are utilized. Incidentally, dual end seals such as end seals 142 and 144 are not common, and are preferred in order to provide a higher certainty of a complete and effective seal.

Figure 13:
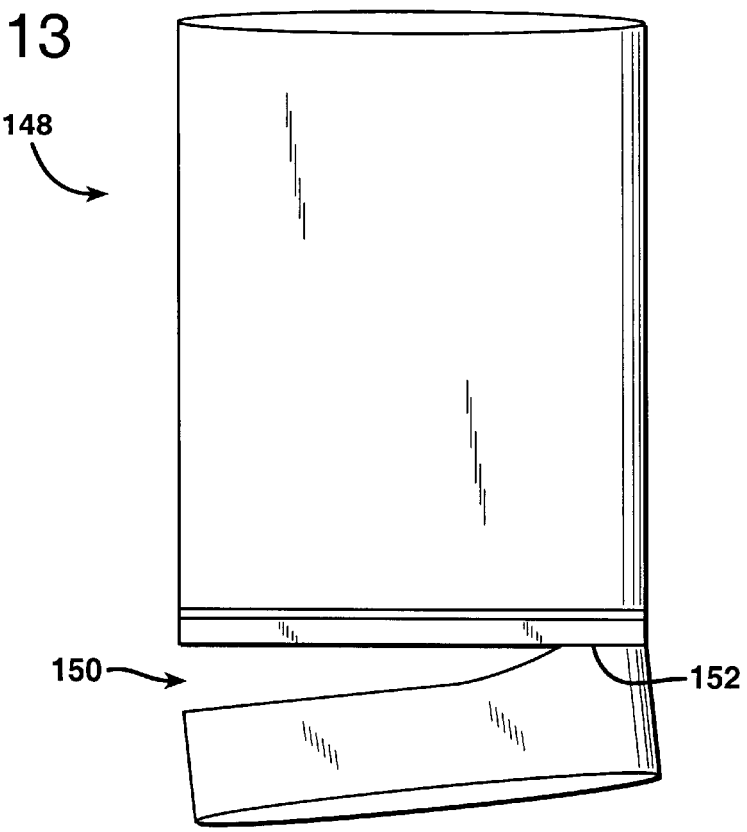
FIG. 13 illustrates a defective end-seal bag having incomplete bag tail cut-off.

FIG. 13 illustrates a defective end-seal bag 148 having an incomplete bag tail cut-off at location 150. The cut extends about three-quarters of the way across bag 148, but does not cut portion 152 of bag 148.

Further Examples and Results

Additional testing was performed on an 8600 machine which was packaging boneless turkey hams. In this further testing, end-seal bags of Film No. 3 and Film No. 2, both as described above, were tested to determine the percentage of packages which exhibited edge tearing as a function of whether the cutting was performed before or after the sealing was carried out.

TABLE IV

| Film No. | Cut-Before-Seal? | Sealing Parameters Volts/Time (sec) | Occurrence of Edge Tears (%) | Seal Failures % | No. of Bags Tested |
|---|---|---|---|---|---|
| 3 | NO  | 32/0.56 | 5.4  | 0.9 | 3800 |
| 3 | YES | 31/0.56 | 2.6  | 0.6 | 3890 |
| 3 | YES | 33/0.56 | 1.3  | 0.4 | 1000 |
| 3 | NO  | 31/0.56 | 8.7  | 0.7 | 1500 |
| 2 | YES | 30/0.51 | 4.3  | 1.8 | 2000 |
| 2 | YES | 32/0.51 | 7.6  | 0.6 | 4000 |
| 2 | NO  | 32/0.51 | 71.1 | 1.2 | 1750 |

As can be seen in Table IV, the packages made using a clamp-cut-seal process of the invention exhibited fewer edge tears than the packages made using the comparative clamp-seal-cut process. This is especially apparent for Film No. 2, which exhibited only about one-tenth the edge tear rate using the clamp-cut-seal process of the invention as using the comparative clamp-seal-cut process. In other words, using a comparative clamp-seal-cut process increased the percentage of edge tears about ten fold relative to the clamp-cut-seal process of the invention. It should be noted that the machine settings were identical with respect to sealing voltage and sealing time (as well as clamping pressure, not provided in the above data). It is very surprising that edge tearing could be reduced to approximately one-tenth of its normal rate by merely changing from the comparative clamp-seal-cut process to the clamp-cut-seal process of the invention.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A process for cutting and sealing a film, comprising:
   (A) clamping at least one film at a first point and a second point, the clamping at the first point being with a means for clamping, and the clamping at the second point being with a means for both clamping and sealing; followed by
   (B) cutting the film with a cutting knife, the cutting being carried out between the first point and the second point; followed by
   (C) sealing the film at the second point with the means for both clamping and sealing;
   wherein the film comprises a seal layer comprising homogeneous ethylene/alpha-olefin copolymer, and wherein the means for both clamping and sealing does not cut through the film.

2. The process according to claim 1, wherein the homogeneous ethylene/alpha-olefin copolymer has a density less than 0.91 g/cc.

3. The process according to claim 2, wherein the homogeneous ethylene/alpha-olefin copolymer has a density of from about 0.88 to 0.91 g/cc.

4. The process according to claim 1, wherein the cutting knife travels independent of the clamping and sealing means.

5. The process according to claim 1, wherein the film is provided as a seamless tubing, and the cutting and sealing are across the tubing so that an end-seal bag is produced.

6. The process according to claim 5, wherein a plurality of end seal bags are produced, configured in a shingled arrangement, and adhered to a tape strand while in the shingled arrangement.

7. The process according to claim 1, wherein the film is provided as an end-seal bag having a bottom seal and an open top, and a product is placed into the bag, with a portion of the bag being cut off so that a shorter bag is produced, followed by making a top seal across the shorter bag so that the product is between the bottom seal and the top seal.

8. The process according to claim 7, wherein an atmosphere within the bag is substantially evacuated therefrom before the top seal is made.

9. The process according to claim 1, wherein the film is provided as a continuous, seamless tubing, and a first seal is made across the tubing, and a second seal is made across the tubing in spaced relation to the first seal, and a first cut is made across and through the tubing in a location so that the second seal is between the first seal and the first cut, whereby a tubing segment is produced, following which a second cut is made along a seamless edge of the tubing segment, so that a side-seal bag having an open top is produced.

10. The process according to claim 1, wherein the film is supplied as a side seal bag, and a product is placed into the bag, with a portion of the bag being cut off so that a shorter bag is produced, followed by making a top seal across the shorter bag so that the product is between the bottom seal and the top seal.

11. The process according to claim 1, wherein the sealing is initiated from about 0.0001 second to about 10 seconds after cutting.

12. The process according to claim 11, wherein the sealing is initiated from about 0.0001 to 0.3 second after cutting.

13. The process according to claim 1, wherein the at least one film has a thickness of from about 0.1 mil to about 50 mils.

14. The process according to claim 13, wherein the film has a thickness of from about 0.2 mil to about 3 mils.

15. The process according to claim 14, wherein the film is provided as an end-seal bag having a bottom seal and an open top, and a product is placed into the bag, wherein an atmosphere is substantially evacuated from the bag, and a portion of the bag being cut off so that a shorter bag is produced, followed by making a top seal across the shorter bag so that the product is between the bottom seal and the top seal.

16. The process according to claim 15, wherein the film is a multilayer film comprising:

a first layer which is an outer film layer and which serves as a seal layer, and which comprises a homogeneous ethylene/alpha-olefin copolymer having a density of about 0.90 g/cc;

a second layer which is an inner film layer film layer and which serves as a bulk layer, and which comprises a homogeneous ethylene/alpha-olefin copolymer having a density of about 0.90 g/cc;

a third layer which is an inner film layer and which serves as a tie layer, and which comprises ethylene/vinyl acetate copolymer;

a fourth layer which is an inner film layer and which serves as an $O_2$-barrier layer, and which comprises polyvinylidene chloride;

a fifth layer which is an inner film layer and which serves as a tie layer, and which comprises ethylene/methyl acrylate copolymer;

a sixth layer which is an inner film layer and which serves as a bulk layer, and which comprises homogeneous ethylene/alpha-olefin copolymer having a density of about 0.90 g/cc; and a seventh layer which is an outer film layer and which serves as an abuse-resistant layer, and which comprises heterogeneous ethylene/alpha-olefin copolymer having a density of about 0.92 g/cc;

wherein the second layer is between the first layer and the third layer, the third layer is between the second layer and the fourth layer, the fourth layer is between the third layer and the fifth layer, the fifth layer is between the fourth layer and the sixth layer, and the sixth layer is between the fifth layer and the seventh layer.

17. The process according to claim 16, wherein the film is a heat-shrinkable film.

18. The process according to claim 1, wherein the sealing is carried out by contacting the at least one film with a seal wire, so that a heat seal is formed.

19. The process according to claim 1, wherein an inside layer of a multilayer, seamless, tubular film, in lay-flat configuration at the sealing means, is sealed to itself.

20. The process according to claim 1, wherein an inside layer of a multilayer, dual-seamed, tubular film, in lay-flat configuration at the sealing means, is sealed to itself.

* * * * *